United States Patent [19]

Ferm et al.

[11] 4,058,973
[45] Nov. 22, 1977

[54] APPARATUS FOR STARTING TURBINE PLANTS

[75] Inventors: Stig Ferm; Ragnar Torstenfelt, both of Finspong, Sweden

[73] Assignee: Stal-Laval Turbin AB, Finspong, Sweden

[21] Appl. No.: 663,589

[22] Filed: Mar. 3, 1976

[30] Foreign Application Priority Data

Mar. 5, 1975 Sweden .................... 7502426

[51] Int. Cl.² .................................................. F02C 7/26
[52] U.S. Cl. .............................. 60/39.09 R; 60/39.14
[58] Field of Search ........ 60/39.14, 39.09 R, 39.09 D, 60/39.09 P, 39.33

[56] References Cited

U.S. PATENT DOCUMENTS

| | | | |
|---|---|---|---|
| 2,617,253 | 11/1952 | Fusner | 60/39.14 |
| 2,822,665 | 2/1958 | Nicolin | 60/39.14 |
| 4,003,200 | 1/1977 | Zerlauth | 60/39.09 R |

Primary Examiner—Carlton R. Croyle
Assistant Examiner—L. J. Casaregola
Attorney, Agent, or Firm—Pollock, Vande Sande & Priddy

[57] ABSTRACT

An apparatus for starting a turbine plant includes tubing or conduits for directing compressed air to the compressor stage of the turbine plant, whereby the turbine plant may be rotated to a speed sufficient for starting. Arranged in parallel with the compressed air tubing or conduits are additional conduits for conveying dry air to the turbine plant during rest or shutdown periods when the turbine plant is inoperative. A valving arrangement permits selective flow of compressed air through the apparatus for starting the turbine plant or of dry air for maintaining desired conditions within the turbine plant during rest or shutdown conditions.

4 Claims, 3 Drawing Figures

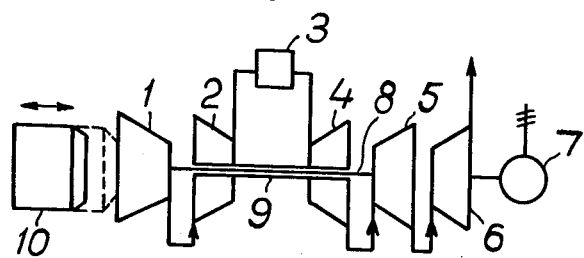
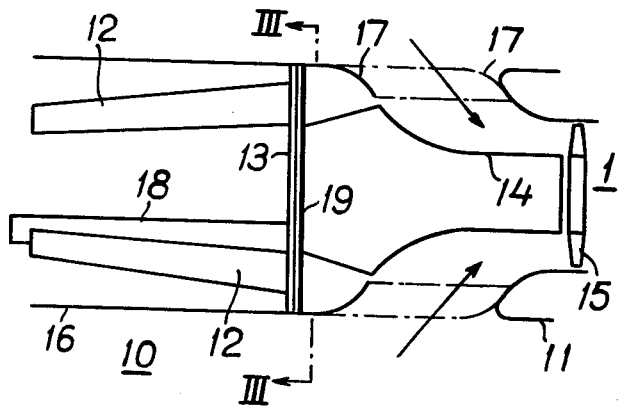
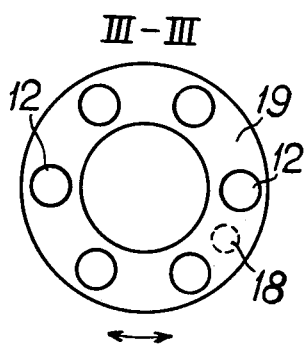

4,058,973

APPARATUS FOR STARTING TURBINE PLANTS

BACKGROUND OF THE INVENTION

The present invention relates to a starting device for gas turbines of the general type disclosed in U.S. Pat. No. 2,822,665, the disclosure of which is hereby incorporated by specific reference in this application. This patent is referred to hereinafter as the "referenced patent." As mentioned in the referenced patent, the starting compressor for such a device may be a motor driven fan or compressor, or a jet compressor of the injector type.

While the device shown in the referenced patent has proven successful for starting gas turbine plants, the fixed location of the starting device at the inlet of the gas turbine in some instances complicates operating and maintenance procedures for the plant during shutdown or rest periods when the turbine plant is not running. Specifically, it is desirable during such shutdown or rest periods to direct a flow of previously dried air through the turbine plant to minimize the formation of condensation on the internal parts of the plant, the collection of dust and other debris within the plant and the like which could damage turbine parts or have a bad effect on subsequent plant operation. Thus, relatively easy access to the inlet of the gas turbine plant is desirable for admitting such a flow of dry air.

OBJECTS OF THE INVENTION

An object of the present invention is to provide a starting device of the general type shown in the referenced patent also having a means for supplying drying air to the turbine plant during shutdown or rest periods.

Another object of the invention is to provide a means for supplying drying air to the turbine plant during shutdown or rest periods without interfering with the normal operation of the starting device.

Another object of the invention is to provide means for drying the turbine plant during shutdown, said means being easily adapted to existing compressed air starting devices.

SUMMARY OF THE INVENTION

The above objects and other desirable advantages are achieved by the present invention which is adapted for use with a turbine having a compressor with an inlet opening. Means for supplying compressed air to the compressor to start the turbine are positioned in front of and spaced from the inlet opening. A selectively displaceable cover means surrounds the means for supplying compressed air to provide a closed air channel between the means for supplying compressed air and the compressor of the turbine plant, when the cover means has been displaced into sealing contact with the inlet opening during turbine starting. Connected in parallel with the means for supplying compressed air is a second means for supplying dry air to the turbine during shutdown or rest periods. Finally, a valve means is provided for selectively admitting either the compressed air or the dry air to the compressor, as desired.

BRIEF DESCRIPTION OF THE DRAWINGS

FIG. 1 shows an overall, schematic view of a a gas turbine plant comprising a starting device according to the present invention.

FIG. 2 shows an elevational, partially sectional view of the inlet geometry of a turbine plant embodying a starting device according to the present invention.

FIG. 3 shows a view taken along line III—III of FIG. 2 indicating the valving arrangement for controlling flow of compressed and dry air.

DETAILED DESCRIPTION OF THE PREFERRED EMBODIMENT

There follows a detailed description of a preferred embodiment of the invention, reference being had to the drawing in which like reference numberals identify like elements of structure in each of the several Figures.

Referring to FIG. 1, a low pressure compressor 1 and a low pressure turbine 5 are mounted on each end of an inner shaft 8. A high pressure compressor 2 and a high pressure turbine 4 are arranged on either end of a hollow shaft 9 surrounding inner shaft 8. Between high pressure compressor 2 and high pressure turbine 4, there are one or more combustion chambers 3. Elements 1 to 5 together form a hot gas generator for a power turbine 6 which drives an electric generator 7, for example.

Located in front of the inlet of low pressure compressor 1 is a starting compressor 10 which serves to force starting air through the turbine plant. Starting compressor 10 and its connection to low pressure compressor 1 are shown in greater detail in FIG. 2. Only the exhaust portion of starting compressor 10 is shown in FIG. 2 in relation to the inlet of low pressure compressor 1. Additional details of a starting compressor 10 suitable for use in the present invention are shown in the referenced patent. Starting compressor 10 comprises a number of substantially parallel conduits or tubes 12 which terminate at and open through a stationary wall or annular disc 13 which is oriented approximately perpendicularly to the shaft of the turbine plant. Between starting compressor 10 and low pressure compressor 1, there is located a flow guide or transition portion 14 shaped as a rotary-symmetrical body which together with the housing 11 surrounding the inlet opening of low pressure compressor 1 forms an annular inlet to the compressor blades 15 of compressor 1.

Inlet tubes 12 and wall or disc 13 are surrounded by a cylindrical cover 16 which is capable of being displaced axially by suitable means (not shown). Cover 16 terminates in a spherical or toroidal part 17 which is shaped to mate with housing 11 during starting operations or during a shutdown or rest period, as indicated in phantom in FIG. 2. During normal operation of the device, cover 16 is retracted to the solid line position shown in FIG. 2. When the turbine plant is to be started, housing 16 is displaced to the phantom position and compressed air is blown through tubes 12 and the extended cover 16, 17 into the annular inlet between housing 11 and transition portion 14, so that the turbine plant is set in motion. When the plant has acquired such a speed that it is possible to start, cover 16, 17 is retracted to the solid line position, whereafter low pressure compressor 1 pulls air into the channel formed by elements 11, 14 and 17.

The invention provides means for conveying dry air to the turbine plant during shutdown or rest periods. Mounted in parallel with inlet tubes 12 is at least one additional tube 18 for conveying dry air to the turbine plant during shutdown or rest periods. The dry air helps remove moisture from the plant, thereby preventing corrosion of the internal parts. Dry air comes from a conventional dry air source, not shown. During a rest period, cover 16, 17 is located in the phantom position shown in FIG. 2 to protect the unit from ambient air.

To separate inlet tubes 12 and additional inlet tube 18 from each other, stationary wall or disc 13 is located in registry with a rotatable valve element or disc 19. Disc 19 has openings therein corresponding in one rotational position of disc 19 to the outlets of tubes 12; and in another position of disc 19, to the outlets of additional tube 18. As indicated in FIG. 3, the outlet from dry air tube 18 has been placed between the outlet from compressed air tubes 12. Those skilled in the art will realize that although only one dry air outlet 18 has been shown, additional outlets could be provided without departing from the spirit of this invention. By rotating the disc 19, the outlets of tubes 12 will be blocked to cut off the flow of compressed air and the outlet of tube 18 will be exposed to permit the flow of dry air.

Having described our invention in sufficient detail to enable those skilled in the art to make and use it, we claim:

1. A starting appratus for a turbine, said turbine having a compressor with an inlet opening, comprising:
    means for supplying compressed air to said compressor to start said turbine, said means being positioned in front of and spaced from said inlet opening;
    a selectively displaceable cover means surrounding said means for supplying compressed air, for providing a closed air channel between said means for supplying compressed air and said compressor when said cover means is displaced into sealing contact with said inlet opening during turbine starting;
    means connected in parallel with said means for supplying compressed air, for supplying dry air to said turbine to minimize formation of condensation and collection of foreign material in said turbine during shutdown periods; and
    means for selectively admitting either said compressed air to said compressor to start said turbine or said dry air to said compressor to protect said turbine during said shutdown periods.

2. A starting apparatus according to claim 1, wherein said means for supplying compressed air comprises at least one tube for conveying said compressed air;
    said means for supplying dry air comprises at least one additional tube in parallel with said at least one tube, both said at least one tube and said at least one additional tube terminating at and opening through a stationary wall; and
    said means for selectively admitting comprises at least one rotatable valve disc registering with said stationary wall, said at least one rotatable valve disc having at least one opening corresponding in one position of said at least one valve disc to the location of said at least one tube, and in another position of said at least one valve disc to the location of said at least one additional tube,
    whereby upon rotation of said rotatable disc said at least one tube is blocked to cut off flow of said compressed air and said at least one additional tube is exposed to permit flow of said dry air.

3. A starting apparatus according to claim 1, wherein said means for supplying dry air is connected through said cover means when said cover means is displaced into contact with said inlet opening to provide said closed air channel during shutdown periods.

4. A starting apparatus according to claim 1, wherein said means for supplying compressed air is spaced sufficiently far from said inlet opening that the air intake to said turbine is not prevented after starting.

* * * * *